United States Patent [19]

Dickerson et al.

[11] Patent Number: 5,259,016
[45] Date of Patent: Nov. 2, 1993

[54] ASSEMBLY FOR RADIOGRAPHIC IMAGING

[75] Inventors: Robert E. Dickerson, Rochester; Phillip C. Bunch, Brighton; David J. Steklenski, Rochester, all of N.Y.

[73] Assignee: Eastman Kodak Company, Rochester, N.Y.

[21] Appl. No.: 965,147

[22] Filed: Oct. 22, 1992

[51] Int. Cl.$^5$ .............................................. G03B 42/04
[52] U.S. Cl. ..................................... 378/186; 378/149; 378/154
[58] Field of Search ............... 378/186, 185, 182, 154, 378/149, 147

[56] References Cited

U.S. PATENT DOCUMENTS

| | | | |
|---|---|---|---|
| 2,133,385 | 10/1938 | Freeman | 250/34 |
| 2,806,958 | 9/1957 | Zunick | 378/154 |
| 3,919,559 | 11/1975 | Stevens | 250/508 |
| 4,127,398 | 11/1978 | Singer, Jr. | 378/149 |
| 4,288,697 | 9/1981 | Albert | 250/505 |
| 4,389,729 | 6/1983 | Stein | 378/149 |
| 4,425,425 | 1/1984 | Abbott et al. | 430/502 |
| 4,425,426 | 1/1984 | Abbott et al. | 430/502 |
| B1 4,425,426 | 8/1988 | Abbott et al. | 430/502 |
| 4,710,637 | 12/1987 | Luckey et al. | 378/37 |
| 4,803,150 | 2/1989 | Dickerson et al. | 430/502 |
| 4,900,652 | 2/1990 | Dickerson et al. | 430/502 |
| 4,951,305 | 8/1990 | Moore et al. | 378/147 |
| 4,969,176 | 11/1990 | Marinos | 378/149 |
| 4,994,355 | 2/1991 | Dickerson et al. | 430/509 |
| 4,997,750 | 3/1991 | Dickerson et al. | 430/509 |
| 5,008,920 | 4/1991 | Gralak | 378/186 |
| 5,021,327 | 6/1991 | Bunch et al. | 430/496 |
| 5,033,046 | 7/1991 | Romero | 378/186 |
| 5,108,881 | 4/1992 | Dickerson et al. | 430/502 |

Primary Examiner—David P. Porta
Attorney, Agent, or Firm—Carl O. Thomas

[57] ABSTRACT

An X-ray imaging assembly is disclosed comprised of (I) a front and back pair of intensifying screens, (II) a radiographic element mounted between the intensifying screens, and (III) a collimating grid The front screen being chosen to exhibit modulation transfer factors greater than those of reference curve A in FIG. 2 . The radiographic element is comprised of a transparent film support, a front silver halide emulsion layer unit coated on the support and located adjacent the front intensifying screen, a back silver halide emulsion layer unit coated on the support and located adjacent the back intensifying screen, and means for reducing crossover to less than 10 percent. The X-ray collimating grid, located to receive X-radiation prior to the front screen, is comprised of an X-ray opaque material forming an array of at least 85 X-ray transmission apertures per inch providing at least 50 percent open area. The apertures have nonlinear boundaries and a ratio of maximum to minimum cross-sectional widths ranging from 1:1 to 3:2.

19 Claims, 3 Drawing Sheets

ASSEMBLY FOR RADIOGRAPHIC IMAGING

FIELD OF THE INVENTION

The invention relates to an assembly for radiographic imaging comprised of a silver halide radiographic element, a pair of intensifying screens and an X-radiation collimating grid.

BACKGROUND OF THE INVENTION

Silver halide photography was well established commercially before the discovery of X-radiation. It was immediately recognized that silver halide photographic elements could be used for X-ray imaging (i.e., as radiographic elements), with medical diagnostic imaging being soon recognized as a important application. However, there were some problems Image contrast was low and X-radiation, particularly in large doses, was soon recognized to present a medical risk.

Investigation revealed that low image contrast resulted from a significant portion of X-radiation passing through a patient being scattered. The solution to this problem was to develop X-ray collimating grids. These grids, usually an array or two perpendicular arrays of linear slats formed of an X-ray opaque material, such as lead, absorb X-radiation that has been deflected in passing through the patient before the X-radiation reaches the radiographic element to be exposed. Examples of X-ray collimating grids are provided by Freeman U.S. Pat. No. 2,133,385, Stevens U.S. Pat. No. 3,919,559, Albert U.S. Pat. No. 4,288,697, and Moore et al U.S. Pat. No. 4,951,305.

The reduction of patient exposure to X-radiation was addressed as soon as the medical risk was appreciated. Silver halide emulsion layers are much less efficient in capturing X-radiation than in capturing light. Only about 1 to 2 percent of X-radiation received on exposure is absorbed by a silver halide emulsion layer. By coating silver halide emulsion layers on opposite sides of a transparent film support (hereinafter referred to as dual coating) X-radiation absorption can be doubled, thereby halving patient exposure.

A still more dramatic reduction in patient exposure was realized by developing X-ray intensifying screens. The function of these screens is to absorb an imagewise pattern of X-radiation and to emit light to the silver halide emulsion layer or layers of a radiographic element. This typically reduces patient exposure to X-radiation by a factor of about 20.

In medical diagnostic radiology the most efficient imaging systems are those that employ a dual coated radiographic element mounted between a front and back pair of intensifying screens. The front screen is intended to expose a silver halide emulsion layer unit on the front side of the support while the back screen is intended to expose a silver halide emulsion layer unit on the back side of the support.

Although used extensively for many years because of their high imaging efficiency, such systems were recognized to produce less than optimum image sharpness, attributable to crossover. Crossover is the term used to indicate exposure by an intensifying screen of the silver halide emulsion layer unit on the opposite side of the support. When the light emitted by the front screen, for example, is not absorbed by the adjacent front emulsion layer unit and passes through to be absorbed by the back emulsion layer unit, the longer light transmission path permits a larger lateral offset between the point of X-ray absorption and the point of light absorption by the back emulsion layer unit than would have occurred if absorption had occurred in the front emulsion layer unit. This larger lateral offset reduces image sharpness.

There have been over the years many attempted solutions to the crossover problem. These are summarized in *Research Disclosure*, Item 18431, August 1979, Section V. Cross-Over Exposure Control. *Research Disclosure* is published by Kenneth Mason Publications, Ltd., Dudley House, 12 North St., Emsworth, Hampshire PO10 7DQ, England. The first step toward a practical and acceptable solution to the problem of crossover occurred with the construction of front and back emulsion layer units employing spectrally sensitized high tabularity emulsions, first described by Abbott et al U.S. Pat. Nos. 4,425,425 and 4,425,426. High tabularity emulsions are those in which tabular grains account for greater than 50 percent of total grain projected area and which satisfy the relationship:

$$ECD/t^2 > 25$$

where

ECD represents the equivalent circular diameter of the tabular grains in micrometers ($\mu$m) and t represents the thickness of the tabular grains in $\mu$m.

Dual coated radiographic elements constructed as taught by Abbott et al are capable of reducing crossover to levels below 20 percent.

The second step toward eliminating the problem of crossover was the addition of processing solution bleachable dye layers beneath the front and back spectrally sensitized high tabularity emulsion layer units, taught by Dickerson et al U.S. Pat. Nos. 4,803,150 and 4,900,652. Following the teachings of Dickerson et al the first practically attractive dual coated radiographic graphic elements with low (<10%) crossover levels were achieved. The Dickerson et al dual coated radiographic elements, in fact, can allow crossover to be eliminated entirely, the term "zero crossover" being applied to such dual coated radiographic elements.

Once practical low and zero crossover dual coated radiographic element constructions were available, it became possible to produce independent image records in the front and back emulsion layer units, allowing further flexibility and improvement in imaging capabilities. Asymmetrical assemblies of dual coated low crossover radiographic elements and intensifying screens are illustrated by Bunch et al U.S. Pat. No. 5,021,327, Dickerson et al U.S. Pat. No. 4,994,355, Dickerson et al U.S. Pat. No. 4,997,750, and Dickerson et al U.S. Pat. No. 5,108,881.

SUMMARY OF THE INVENTION

Low and zero crossover dual coated radiographic elements exhibit levels of image sharpness that were never previously realizable. Unfortunately, this has led to a new problem. When a conventional slat collimating grid is employed with a conventional dual coated radiographic element exhibiting more than 10 percent crossover, there is little, if any, visual evidence in the image obtained of the grid pattern. When a low or zero crossover dual coated radiographic element is substituted, an objectionable image of the collimating grid is superimposed on the image sought. The superimposed grid image is at best a distraction to the radiologist and at worst may result in a misreading of the radiograph—e.g., an erroneous medical diagnosis.

In one aspect this invention is directed to an X-ray imaging assembly comprised of (I) a front and back pair of intensifying screens each capable of absorbing X-radiation and emitting electromagnetic radiation longer than 300 nm, the front screen being chosen to exhibit modulation transfer factors greater than those of reference curve A in FIG. 2, (II) a radiographic element mounted between the front and back intensifying screens comprised of a transparent film support, a front spectrally sensitized high tabularity silver halide emulsion layer unit coated on the support and located adjacent the front intensifying screen, a back spectrally sensitized high tabularity silver halide emulsion layer unit coated on the support and located adjacent the back intensifying screen, and means for reducing to less than 10 percent crossover to the front and back emulsion layers from the back and front screens, respectively, of radiation longer than 300 nm in wavelength, and (III) an X-ray collimating grid located adjacent the front screen to receive X-radiation prior to the front screen comprised of an X-ray opaque material forming an array of at least 85 X-ray transmission apertures per inch providing at least 50 percent open area, the apertures having nonlinear boundaries and a ratio of maximum to minimum cross-sectional widths ranging from 1:1 to 3:2.

It has been discovered quite unexpectedly that by employing an X-ray collimating grid of the structure noted above the superimposed image pattern produced by conventional slat collimating grids is either eliminated or sufficiently diminished as to be no more than minimally noticeable. The resulting radiographic imaging assembly is capable of realizing high levels of imaging sensitivity, high levels of image sharpness, and high levels of image contrast without an objectionably noticeable grid pattern superimposed on the image.

BRIEF DESCRIPTION OF THE DRAWINGS

The invention can be better appreciated by reference to the following detailed description of the invention considered in conjunction with the drawings wherein.

DESCRIPTION OF PREFERRED EMBODIMENTS

Figure 1:
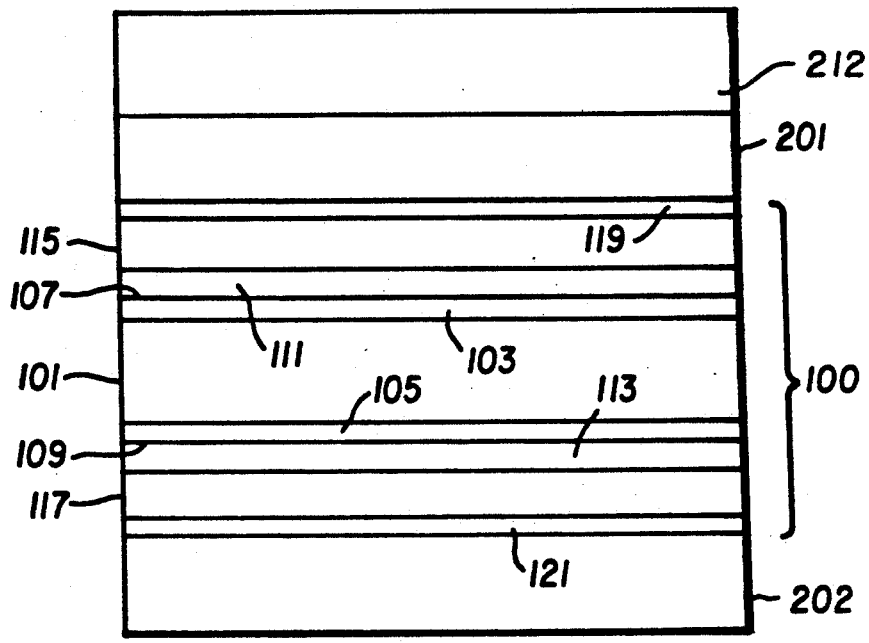
FIG. 1 is a schematic diagram of a radiographic imaging assembly consisting of an X-ray collimating grid, a front intensifying screen, a dual coated radiographic element, and a back intensifying screen.

In FIG. 1 a radiographic imaging assembly satisfying the requirements of the invention is shown consisting of an X-ray collimating grid 212, a front intensifying screen 201, a dual coated radiographic element 100, and a back intensifying screen 202.

To satisfy the imaging assembly requirements of the invention the radiographic element is comprised of a transparent film support, a front spectrally sensitized high tabularity silver halide emulsion layer unit coated on the support and located adjacent the front intensifying screen, a back spectrally sensitized high tabularity silver halide emulsion layer unit coated on the support and located adjacent the back intensifying screen, and means for reducing to less than 10 percent crossover to the front and back emulsion layers from the back and front screens, respectively, of radiation longer than 300 nm in wavelength.

In the preferred construction shown in FIG. 1 the radiographic element 100 is comprised of a transparent film support 101, typically blue tinted (a customary preference of radiologists), and optional subbing layer units 103 and 105, each of which can be formed of one or more adhesion promoting layers. On the first and second opposed major faces 107 and 109 of the subbing layer units are crossover reducing hydrophilic colloid layers 111 and 113, respectively. Overlying the crossover reducing layers 111 and 113 are light recording latent image forming silver halide emulsion layer units 115 and 117, respectively. Each of the emulsion layer units is formed of one or more hydrophilic colloid layers including at least one high tabularity silver halide emulsion layer. Overlying the emulsion layer units 115 and 117 are optional protective overcoat layers 119 and 121, respectively. All of the protective layers and hydrophilic colloid layers are permeable to processing solutions.

The front and back intensifying screens 201 and 202 are each capable of absorbing X-radiation and emitting electromagnetic radiation longer than 300 nm. To produce sharp images it is not only essential that the radiographic element exhibit low (less than 10 percent) crossover, it is also necessary that at least the front intensifying screen have the capacity to emit sharp image patterns. The front screen therefore is chosen to exhibit modulation transfer factors greater than those of reference curve A in FIG. 2.

The X-ray collimating grid 212 is located to receive X-radiation prior to the front screen 201. Typically some of the X-radiation reaching the grid has been absorbed and some deflected in passing through the imaging subject (e.g., the chest or abdomen of a medical patient). The function which the grid must perform is to minimize the deflection component of the X-radiation reaching the emulsion layer units. To accomplish this the grid must contain openings that allow the transmission of nondeflected X-radiation from the imaging subject to the radiographic element, and the openings must be formed by an X-ray opaque material capable of absorbing the deflected component of the X-radiation.

It has been discovered quite unexpectedly that the visual impact of the grid pattern on the radiographic image can be significantly reduced or eliminated by forming apertures with nonlinear boundaries in an X-radiation opaque material. In all instances the grid contains an array of at least 85 X-ray transmission apertures per inch providing at least 50 percent open area.

Circular apertures are most convenient to construct and are preferred; however, apertures with nonlinear boundaries can take any convenient geometrical form that approximates a circular form—e.g., an elliptical or oval form. Generally any aperture having nonlinear boundaries and a ratio of maximum to minimum cross-sectional widths ranging from 1:1 to 3:2 is satisfactory for purposes of this invention. It is believed that the nonlinear boundaries of the apertures are responsible for visually obscuring the grid pattern as a component of the radiographic image. The restricted ratio of maximum to minimum cross-sectional widths insures that curved boundaries that approach linearity are excluded.

If fewer than 85 apertures per inch are present in the grid, the radiographic image will have an uneven texture—i.e., a gritty or grainy appearance. Thus, for purposes of this invention the grids should have at least 85 radiation apertures per linear inch and an open area ranging from about 50 to about 70 percent, and more preferably, from 60 to 65 percent open area. The open area or openness of the X-ray opaque sheet reflects the amount of lead or other X-ray opaque material removed from the sheet in forming the apertures. More specifically, the density of the radiation apertures should range from 85 to about 200 per linear inch. For most applications, the density of the radiation apertures is from 85 to about 130 per linear inch, most preferably in the range from about 115 to about 130 apertures/linear inch. In the case of mammography where higher resolution and sharpness is needed, the number of apertures can be in the range of 180 to 200 per linear inch.

Figure 3:
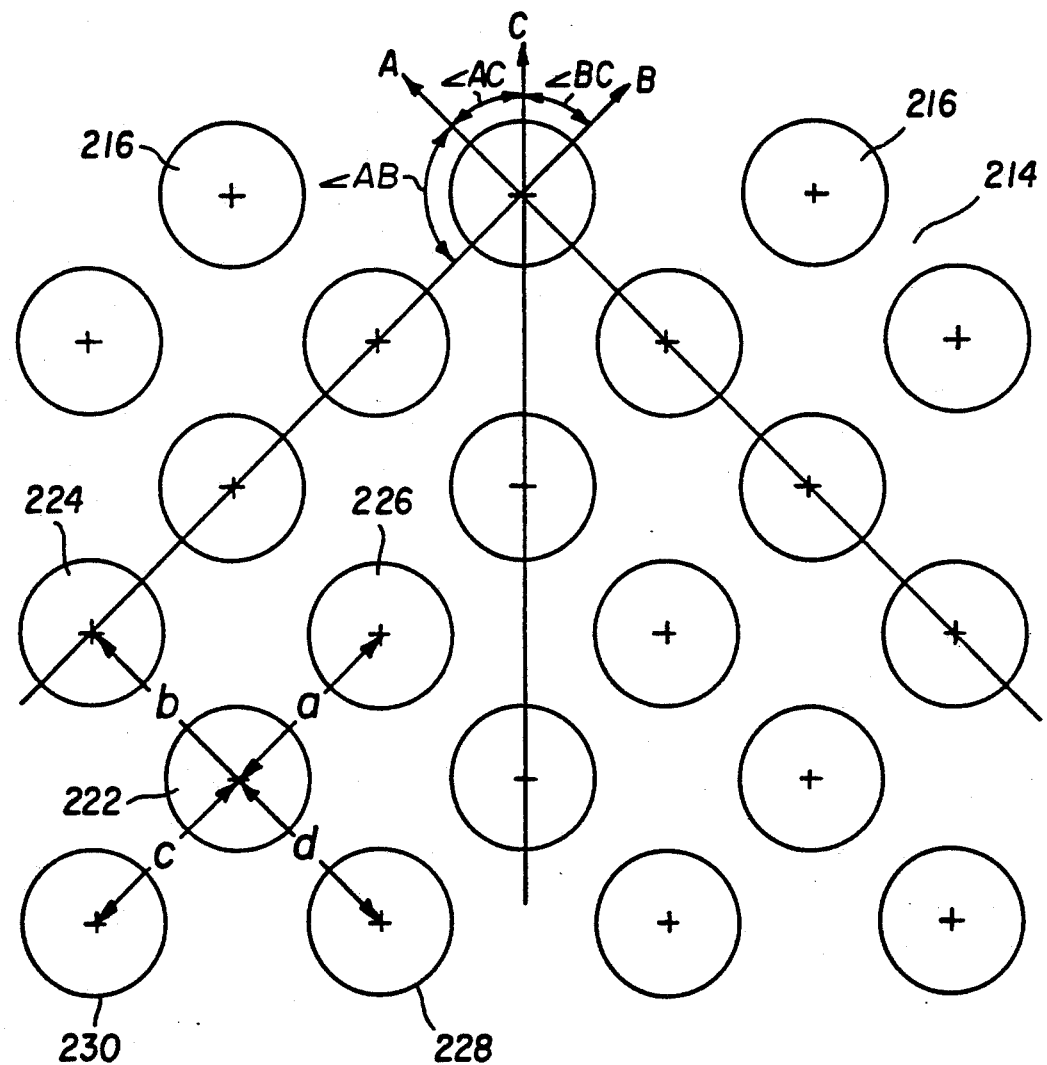
FIG. 3 is a magnified plan view of a halftone pattern of X-radiation transmission apertures of type found in one preferred embodiment of the collimating grid.

The apertures can be arranged in any convenient array. The array can embody any of a variety of known patterns. In one preferred form of the invention the grid apertures are arranged in the form of a halftone pattern, as illustrated in FIG. 3. The term "halftone" is intended to denote a pattern in which a central aperture is equidistant from four adjacent apertures. For example, central radiation aperture 222 has as its nearest four neighbors radiation apertures 224, 226, 228 and 230. The distances a, b, c and d between central aperture 222 and four neighboring apertures 224, 226, 228 and 230 are equal.

In the form shown the angle between lines connecting the centers of the nearest neighbors is 90° (angle AB), i.e. the angle between axes A and B. This is, however, only one of a family possible halftone aperture arrangements. Axes A and B each form 45° angles AC and BC, respectively, with axis C. By varying angles AC and BC equally alternative halftone patterns are created. Although AC and BC are preferably 45° angles, a workable range of angles is from 30° to 75°.

Figure 4:
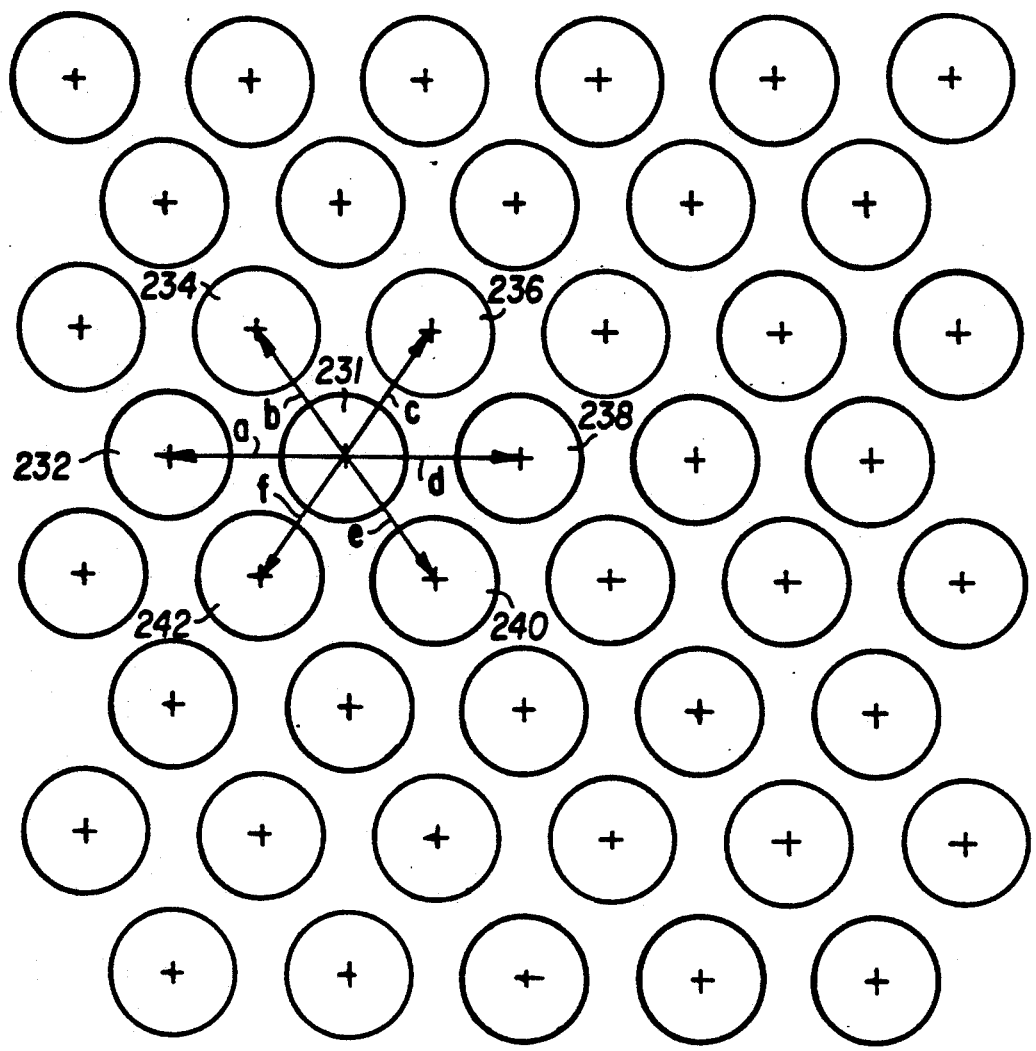
FIG. 4 is a magnified plan view of a hexagonal array of X-radiation transmission apertures of the type found in a second preferred embodiment of the collimating grid.

A second preferred aperture pattern is the hexagonal pattern shown in FIG. 4. The hexagonal pattern consists of central apertures (e.g., aperture 231 and six nearest neighboring apertures 232, 234, 236, 238, 240 and 242 at distances a, b, c, d, e and f, between aperture centers which are equal. Notice that in the hexagonal pattern the adjacent apertures lie along one of three axis orientations and notice that the axes intersect at 60° angles.

Figure 5:
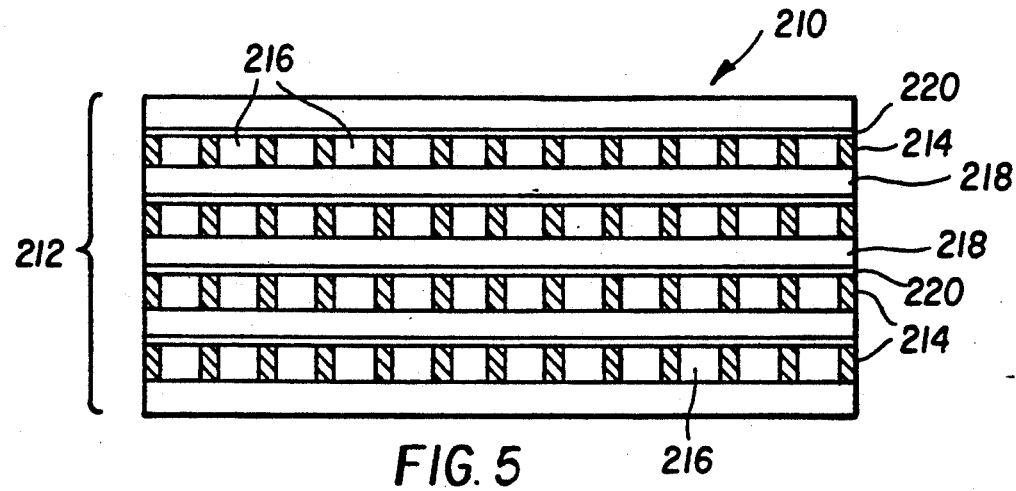
FIG. 5 is an enlarged side sectional view of a preferred apertured multilayer radiographic collimating grid.

So long as the grid is formed of an X-ray opaque material and contains the apertures described above its remaining structural features can take any convenient conventional form. A particularly preferred construction of grid 212 that offers the advantages of relatively light weight and flexibility is shown in FIG. 5. The grid consists of a stacked series of sheets comprised of an X-ray transparent support 218 which is preferably a polymeric film support of high dimensional integrity, such as poly(ethylene terephthalate, and an X-ray opaque layer 214 containing apertures 216. The sheets are assembled as a unitary element using adhesive layers 220 with an extra support 218 positioned on the top of the stack to protect the uppermost X-ray opaque layer. The apertures in the stacked layers are in alignment. The alignment can be a vertical alignment as shown or a focused alignment—that is the centers of apertures in the stack can be aligned along the direction of transmission of X-radiation. The grid can be formed of any desired number of stacked sheets. A convenient construction contains from 4 to 14 sheets with from 6 to 10 sheets being preferred. Further details of this preferred grid construction are provided by Moore et al U.S. Pat. No. 4,951,305, the disclosure of which is here incorporated by reference.

Whereas conventional slat grids are too heavy and inflexible to be used conveniently when a patient must be examined using a portable bedside radiographic exposure unit, the lightweight and flexibility of the grid construction of FIG. 5 allows it to be employed for bedside applications. Assemblies satisfying the requirements of the present invention allow high quality images to be obtained, even when portable radiographic imaging units are employed.

Figure 2:
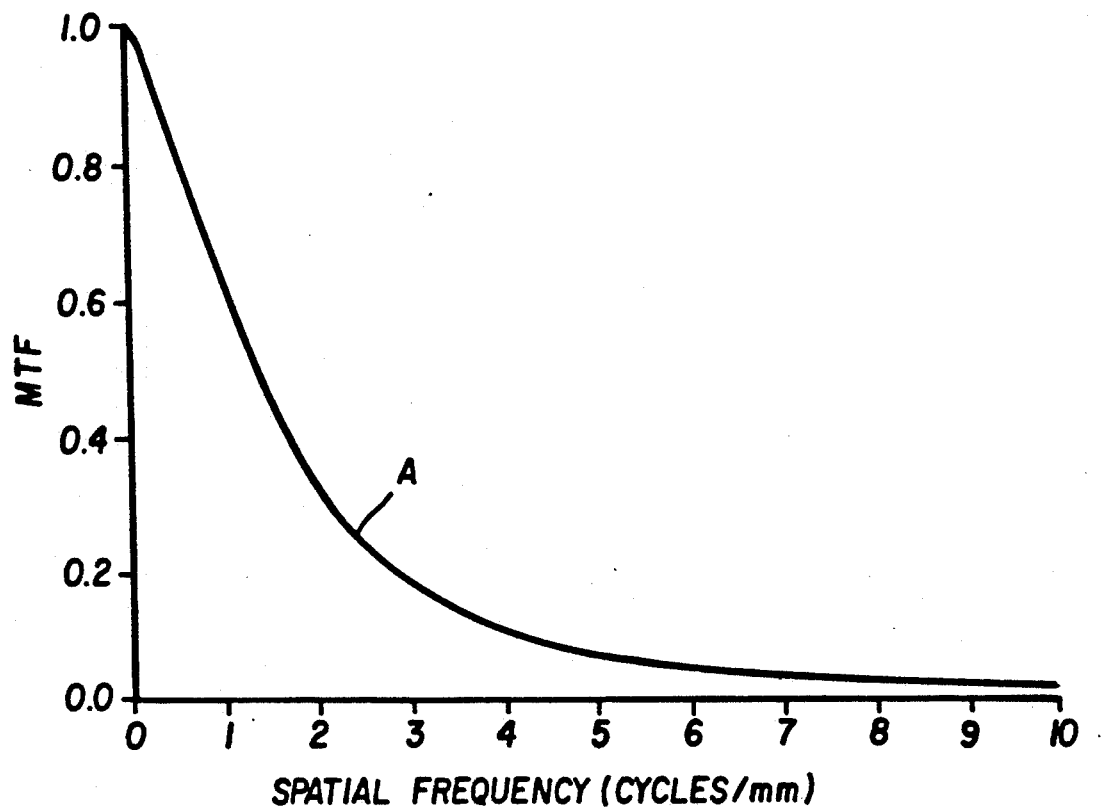
FIG. 2 is a plot of modulation transfer factors (MTF) versus spatial frequency in cycles per millimeter, providing a boundary for minimum acceptable MTF levels of the front intensifying screen of FIG. 1.

The intensifying screens can take any convenient conventional form, provided at least the front screen exhibits modulation transfer factors (MTF) greater than those of reference curve A in FIG. 2. The numerical values of MTF are provided in Table I in the Examples below. From FIG. 2 and Table I it is apparent that MTF varies as a function of spatial frequency measured in cycles per millimeter (mm). MTF measurement for screen-film radiographic systems is described by Kunio Doi et al, "MTF and Wiener Spectra of Radiographic Screen-Film Systems", U.S. Department of Health and Human Services, pamphlet FDA 82-8187. The profile of the individual MTF factors over a range of cycles per mm constitutes a modulation transfer function. Preferred lower MTF limits for front and back screen employed for mammographic imaging applications are set out in FIG. 3 and Table III of Luckey et al U.S. Pat. No. 4,710,637, the disclosure of which is here incorporated by reference.

To obtain the sharpest possible images it is generally preferred to select phosphors for construction of the front screen and, preferably, both the front and back screens that produce satisfactory levels of light emission with the thinnest possible fluorescent layer thicknesses. In one specifically preferred form the front and back intensifying screens each include a fluorescent layer comprised of a phosphor chosen from rare earth oxychalcogenide and halide phosphors of the formula:

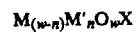

$$M_{(w-n)}M'_nO_wX$$

wherein:

M is at least one of the metals yttrium, lanthanum, gadolinium, or lutetium,

M' is at least one of the rare earth metals dysprosium, erbium, europium, holmium, neodymium, praseodymium, samarium, terbium, thulium, or ytterbium, X is a middle chalcogen (S, Se, or Te) or halogen, n is 0.0002 to 0.2, and w is 1 when X is halogen or 2 when X is chalcogen.

Other specifically preferred phosphors include calcium tungstate, niobium-activated or thulium-activated yttrium tantalate, and terbium-activated gadolinium or lutetium oxysulfide.

Calcium tungstate phosphors are illustrated by Wynd et al in U.S. Pat. No. 2,303,942. Niobium-activated and rare earth activated yttrium, lutetium and gadolinium tantalates are disclosed by Brixner in U.S. Pat. No. 4,225,653. Rare earth activated gadolinium and yttrium middle chalcogen phosphors are taught by Royce in U.S. Pat. No. 3,418,246. Rare earth activated lanthanum and lutetium middle chalcogen phosphors are illustrated by Yocom in U.S. Pat. No. 3,418,247. Terbium-activated lanthanum, gadolinium and lutetium oxysulfide phosphors are disclosed by Buchanan et al in U.S. Pat. No. 3,725,704. Cerium activated lanthanum oxychloride phosphors are taught by Swindells in U.S. Pat. No. 2,729,604. Terbium activated and optionally cerium activated lanthanum and gadolinium oxyhalide phosphors are disclosed by Rabatin in U.S. Pat. No. 3,617,743 and Ferri et al in U.S. Pat. No. 3,974,389. Rare earth activated rare earth oxyhalide phosphors are disclosed by Rabatin in U.S. Pat. Nos. 3,591,516 and 3,607,770. Terbium activated and ytterbium activated rare earth oxyhalide phosphors are disclosed by Rabatin in U.S. Pat. No. 3,666,676. Thulium activated lanthanum oxy-chloride or oxybromide phosphors are illustrated by Rabatin in U.S. Pat. No. 3,795,814. A (Y,Gd)$_2$O$_2$S:Tb phosphor wherein the ratio of yttrium to gadolinium is between 93:7 and 97:3 is illustrated by Yale in U.S. Pat. No. 4,405,691. Nonrare earth co-activators can be employed as illustrated by bismuth and ytterbium activated lanthanum oxychloride phosphors disclosed by Luckey et al in U.S. Pat. No. 4,311,487. The mixing of phosphors as well as the coating of phosphors in separate layers of the same screen are specifically recognized. A phosphor mixture of calcium tungstate and yttrium tantalate is disclosed by Patten in U.S. Pat. No. 4,387,141. However, in general neither mixtures nor multiple phosphor layers within a single screen are preferred or required.

While it is recognized that the phosphor layers need not contain separate binders, in most applications the phosphor layers contain sufficient binder to provide structural coherence to the phosphor layer. In general, the binders useful in the practice of the invention are those conventionally employed in the art. Binders are generally chosen from a wide variety of known polymers which are transparent to X-radiation and emitted light. Binders commonly employed in the art include sodium o-sulfobenzaldehyde acetal of poly(vinyl alcohol), chlorosulfonated polyethylene; a mixture of macromolecular bisphenol polycarbonates and copolymers comprising bisphenol carbonates and poly(alkylene oxides); aqueous ethanol soluble nylons; poly(alkyl acrylates and methacrylates) and copolymers of poly(alkyl acrylates and methacrylates) with acrylic and methacrylic acids; poly(vinyl butyral); and polyurethane elastomers. These and other useful binders are disclosed in U.S. Pat. Nos. 2,502,529; 2,887,379; 3,617,285; 3,300,310; 3,300,311 and 3,743,833, and in *Research Disclosure*, Vol. 154, February, 1977, Item 15444, and Vol. 182, June, 1979. *Research Disclosure* is published by Kenneth Mason Publications, Ltd., Emsworth, Hampshire P010 7DD, England. Particularly preferred binders are polyurethanes, such as those commercially available under the trademark Estane from Goodrich Chemical Co., and under the trademark Permuthane from the Permuthane Division of Beatrice Foods Co.

While a wide range of phosphor to binder ratios can be employed, generally thinner phosphor layers and sharper images are realized when a high weight ratio of phosphor to binder is employed. Preferred phosphor to binder ratios are in the range of from about 10:1 to 25:1 for screen constructions intended to equal commercial screen exposure repetitions without loss of structural integrity. For limited or single exposure applications it is, of course, appreciated that any minimal amount of binder consistent with structural integrity is satisfactory.

In those instances in which it is desired to reduce the effective thickness of a phosphor layer below its actual thickness (thereby enhancing sharpness) the phosphor layer is modified to impart a small, but significant degree of light absorption. If the binder is chosen to exhibit the desired degree of light absorption, then no other ingredient of the phosphor layer is required to perform the light attenuation function. For example, a slightly yellow transparent polymer will absorb a significant fraction of phosphor emitted blue light. U/V absorption can be similarly achieved. It is specifically noted that the less structural complex chromophores for U/V absorption particularly lend themselves to incorporation in polymers.

In most instances a separate absorber is incorporated in the phosphor layer to reduce its effective thickness. The absorber can be a dye or pigment capable of absorbing light within the spectrum emitted by the phosphor. Yellow dye or pigment selectively absorbs blue light emissions and is particularly useful with a blue emitting phosphor. On the other hand, a green emitting phosphor is better used in combination with magenta dyes and pigments. U/V emitting phosphors can be used with known U/V absorbers. Black dyes and pigments are, of course, generally useful with phosphors because of their broad absorption spectra. Carbon black is a preferred light absorber for incorporation in the phosphor layers. Luckey et al in U.S. Pat. No. 4,259,588, hereby incorporated by-reference, teach that increased sharpness can be achieved by incorporating a yellow dye in a terbium-activated gadolinium oxysulfide phosphor layer.

The patents cited above for phosphor teachings also disclose useful intensifying screen constructions. Screen supports are most commonly film supports of high dimensional integrity, and include PET film supports, for example. For best image definition, when the front screen support and subbing and anticurl layers are transparent, the phosphor layer contains an absorber or a black surface is positioned adjacent the anticurl layer during exposure. For example, a black polyvinyl chloride or paper sheet can be positioned adjacent the anticurl layer. Typically, the adjacent interior surface of the cassette in which the assembly is mounted is a black polyurethane or similar polymeric foam layer, which can be relied upon for light absorption contributing to image sharpness.

When the screen supports are not themselves black, best sharpness levels are realized when a black film or paper is interposed between the cassette and each screen of the image recording assembly. Independently of cassette construction the front screen support and/or its subbing and anticurl layers can be black or suitably colored to absorb emitted light, thereby minimizing light reflection and image sharpness degradation. The back screen support as well as its subbing and anticurl layers can be of the same form as described for the front screen. If desired to increase speed, either or both of the front and back screen supports and/or their subbing or anticurl layers can be reflective of emitted light. For example, a blue or white back screen support can be chosen to reflect light emitted by calcium tungstate or rare earth-activated yttrium tantalate or a green or white support can be chosen to reflect light emitted from a rare earth-activated lutetium gadolinium oxysulfide phosphor. Titania is preferably coated on or incorporated in the front and back screen supports to maximize reflection of green light. Metal layers such as aluminum can be used to enhance reflection. Paper supports, though less common for intensifying screens than film supports, are known and can be used for specific applications.

Dyes and pigments are commonly loaded into supports to enhance absorption or reflection of light. Air can be trapped in supports to reflect U/V light. Intensifying screen supports and the subbing layers used to improve coating adhesion can be chosen from among those employed for silver halide photographic and radiographic elements, as illustrated by *Research Disclosure*, Item 17643, supra, Section XVII, and *research Disclosure*, Item 18431, supra, Section I, the disclosures of which are hereby incorporated-by-reference herein.

An overcoat, though not required, is commonly located over the phosphor layer for humidity and wear protection. The overcoat can be chosen using the criteria described above in connection with the binder. The overcoat can be chosen from among the same polymers used to form either the screen binder or the support, with the requirements of toughness and scratch resistance usually favoring polymers conventionally employed for film supports. For example, cellulose acetate is a preferred overcoat used with the preferred polyurethane binders. Overcoat polymers are often used also to seal the edges of the phosphor layer While anticurl layers are not required for the intensifying screens, they are generally preferred for inclusion. The function of the anticurl layer is to balance the forces exerted by the layers coated on the opposite major surface of the screen support which if left unchecked, cause the screen to assume a non-planar configuration, e.g. to curl or roll-up on itself. Materials forming the anticurl layers can be chosen from among those identified above for use as binders and overcoats. Generally, an anticurl layer is formed for the same polymer as the overcoat on the opposite side of the support. For example, cellulose acetate is preferred for both overcoat and anticurl layers.

To prevent blocking, particularly adhesion of the radiographic element and intensifying screens, the overcoats of the phosphor layers can include a matting agent, although more commonly employed in radiographic elements then with screens. Useful matting agents can be selected from those cited by *Research Disclosure*, Item 308119, December 1989, Section XVI. A variety of other optional materials can be included in the surface coatings of the intensifying screens, such as materials to reduce static electrical charge accumulation, plasticizers, lubricants, and the like. However, such materials are more commonly included in the radiographic elements which come into contact with the intensifying screens.

The radiographic elements forming a part of the imaging assemblies of the invention contain in the front and back emulsion layer units at least one spectrally sensitized high tabularity silver halide emulsion, where "high tabularity" is defined as described in the Background section of the specification. Typically tabularities range from 40 to 1000 although both higher and lower tabularities can be employed to advantage. Specifically preferred tabular grain emulsions are those in which greater than 50 percent, preferably at least 70 percent and optimally at least 90 percent of the total grain population is accounted for by tabular grains having a thickness of less than 0.3 $\mu$m and preferably less than 0.2 $\mu$m. The tabular grain emulsions are contemplated to have average aspect ratios (ECD/t) of at least 5 and preferably at least 8. Any conventional tabular grain emulsion satisfying these criteria can be employed, but for radiographic applications it is generally preferred to limit iodide concentrations to less than 5 mole percent, optimally less than 3 mole percent, based on total silver.

The presence of high tabularity silver halide emulsions in dual coated radiographic elements does not in itself reduce crossover. Rather it is the combination of high tabularity emulsions and spectral sensitizing dyes adsorbed to the surfaces of the tabular grains that is responsible for crossover reduction. Any conventional spectral sensitizing dye can be incorporated in an emulsion layer unit that is capable of absorbing light of a wavelength emitted by the intensifying screen with which it is paired. Generally the spectrally sensitizing dye is chosen to exhibit a peak absorption as absorbed to the silver halide grain surfaces that closely matches the peak emission wavelength of the intensifying screen. An extensive listing of useful spectral sensitizing dyes for tabular grain emulsions is provided by Kofron et al U.S. Pat. No. 4,439,520, the disclosure of which is here incorporated by reference.

Any conventional dual coated radiographic element exhibiting low ($<10\%$) crossover can be employed in the radiographic imaging assemblies of the invention. This means simply that of the light emitted by one intensifying screen adjacent one emulsion layer unit less than 10 percent reaches the emulsion layer unit on the opposite side of the support. Preferred dual coated radiographic elements are those than exhibit crossover of less than 5 percent and, optimally, measurable (zero) crossover. Techniques for crossover measurement are disclosed in Abbott et al U.S. Pat. Nos. 4,425,425 and 4,425,426, the disclosures of which are here incorporated by reference.

Low crossover is preferably achieved by incorporating at least one crossover reducing layer between the support and an overlying emulsion layer unit in a radiographic element. In the radiographic element 100 preferred forms of the crossover reducing layers 111 and 113 are those disclosed by Dickerson et al U.S Pat. Nos. 4,803,150 and 4,900,652, here incorporated by reference. As therein disclosed, microcrystalline dyes capable of being decolorized during processing can be incorporated in hydrophilic colloid binders to form the crossover reducing layers. To permit rapid processing (processing in less than 90 seconds) it is preferred to limit the hydrophilic colloid content of the crossover reducing layers to less than 65 mg/dm$^2$. Another technique for crossover reduction useful with blue emitting intensifying screens is to incorporate $\beta$ phase silver iodide particles in the crossover reducing layers, as taught by Daubendiek et al U.S. Pat. No. 4,639,411.

It has been recently recognized that imaging advantages can be realized by constructing low crossover dual coated radiographic elements with asymmetrical emulsion layer units. Dickerson et al U.S. Pat. No. 4,994,355, here incorporated by reference, demonstrates medical application advantages for such radiographic elements constructed with a first emulsion layer unit exhibiting a contrast of less than 2.0 and a second emulsion layer unit exhibiting a contrast of at least 2.5. Both contrasts were based on measurements at 0.25 and 2.0 above minimum density and with the first and second emulsion layer units each being coated on both sides of a transparent support, thereby allowing contrasts to be measured in a manner comparable to contrast measurements on symmetrical radiographic elements Dickerson et al U.S. Pat. No. 4,997,750, here incorporated by reference, demonstrates increased flexibility in imaging to result from constructing dual coated low crossover radiographic elements with emulsion layer units on opposite sides of the support that differ in speed. Specifically, at a density of 1.0 above minimum density the speed of one emulsion layer unit is advantageously increased to at least twice than of the remaining emulsion layer unit. Again, as in the case of the asymmetrical contrast emulsion layer units above, speed measurements of each emulsion layer unit are based on symmetrical coatings on both sides of a support. Speed differences of from 2 to 10 times are contemplated with speed differences of from 2 to 4 times being preferred.

Bunch et al U.S. Pat. No. 5,021,327, here incorporated by reference, discloses extending asymmetry of the radiographic imaging assembly beyond asymmetry in the dual coated low crossover radiographic elements to differences in the photicity of the front emulsion layer unit and front screen as compared to the photicity of the back emulsion layer unit and back screen. Specifically, Bunch et al discloses that improvements in detective quantum efficiencies (DQE), the ratio of input noise to output noise, can be improved by increasing the photicity of the back portion of the assembly to at least twice (preferably from 2 to 10 times) that of the front portion of the assembly. As explained by Bunch et al, photicity is the integrated product of (1) the total emission of the screen over the wavelength range to which the emulsion layer is responsive, (2) the sensitivity of the emulsion layer unit over this emission range, and (3) the transmittance of radiation between the screen and the adjacent emulsion layer unit over this emission range. Transmittance is typically near unity and can in this instance be ignored. Photicity is discussed in greater detail in Mees, *The Theory of the Photographic process*, 3rd Ed., Macmillan, 1966, at page 462. From the above definition of photicity it is apparent that the desired asymmetry in photicity can be realized with asymmetrical emulsion layer unit selections, asymmetrical screen selections or a combination.

In fact, any one or combination of speed, contrast and photicity can be varied to achieve specific imaging advantages. Dickerson et al U.S. Pat. No. 5,041,364 and Dickerson et al U.S. Ser. No. 746,687, filed Aug. 16, 1991, commonly assigned, both disclose different asymmetrical speed and contrast selections to better serve specific medical diagnostic needs.

Figure 6:
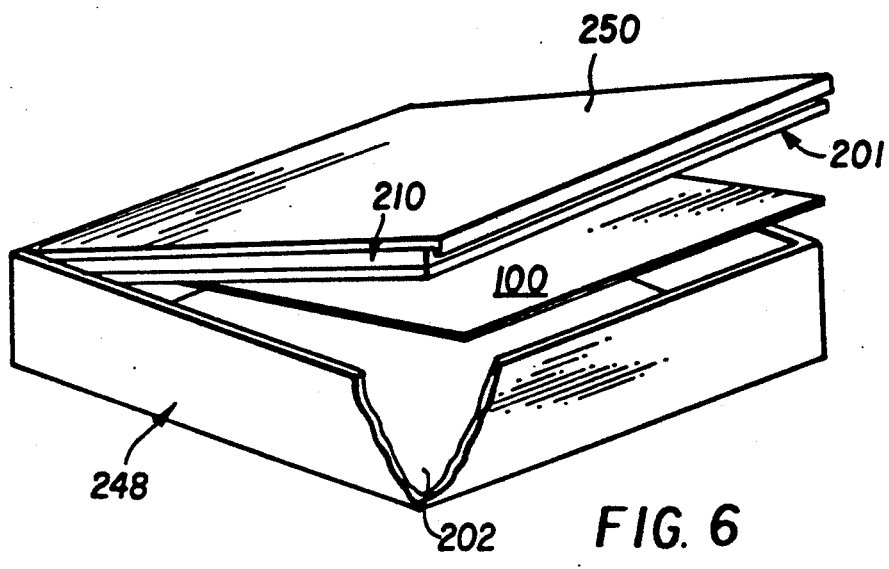
FIG. 6 is a perspective view of a cassette housing containing the imaging assembly of FIG. 1.

An advantage of the radiographic imaging assemblies of the invention when the grid is constructed in its preferred light weight, flexible form is that the entire assembly can be introduced for use in a single mounting housing, commonly referred to as a cassette. The low weight of the grid, typically 8.5 ounces or less per square foot, and the lack of fragility of the grid permit it to be safely and easily introduced with the radiographic element and screens in the cassette. FIG. 6 provides a view of a partially opened cassette 248 for bedside radiography. Cassette 248 includes a cover 250 to which the flexible stacked grid 212 and the front intensifying screen 201 are, as shown, attached, although attachment is optional. The radiographic element 100 and the back intensifying screen 202 are also present in the cassette When the cassette is closed for use all of the elements of the imaging assembly are held firmly in position by compression. Usually a compressible pad, not shown, is included for this purpose, although the same effect can be realized by constructing the cassette with a concave curvature of the cover and cooperating bottom surface of the cassette. These cassette features and other preferred features intended to prevent inadvertent misorientation of assembly elements are illustrated in FIG. 2 of Jebo et al Statutory Invention Registration H1105, published Sep. 1, 1992, the disclosure of which is here incorporated by reference.

Following exposure to produce a stored latent image the radiographic element 100 is removed from association with the intensifying screens and the scatter radiation reducing grid for processing in a rapid access processor, such as an RP-X-Omat ™ processor, which is capable of producing an image bearing radiographic element dry to the touch in less than 90 seconds. Rapid access processors are disclosed by Barnes et al, U.S. Pat. No. 3,545,971 and Akio et al published European Patent Application 248,390.

Since rapid access processors employed commercially vary in their specific processing cycles and selection of processing solutions, the preferred radiographic elements satisfying the requirements of the present invention are specifically identified as being those which are capable of emerging dry to the touch when processed in 90 seconds according to the following reference conditions:

| development | 24 seconds at 35° C., |
|---|---|
| fixing | 20 seconds at 35° C., |
| washing | 10 seconds at 35° C., and |
| drying | 20 seconds at 65° C., | where the remaining time is taken up in transport between processing steps. The development step employs the following developer:

| Hydroquinone | 30 g |
|---|---|
| 1-Phenyl-3-pyrazolidone | 1.5 g |
| KOH | 21 g |
| NaHCO$_3$ | 7.5 g |
| K$_2$SO$_3$ | 44.2 g |
| Na$_2$S$_2$O$_5$ | 12.6 g |
| NaBr | 35 g |
| 5-Methylbenzotriazole | 0.06 g |
| Glutaraldehyde | 4.9 g |

Water to 1 liter at pH 10.0, and the fixing step employs the following fixing composition:

| Ammonium thiosulfate 60% | 260.0 g |
|---|---|
| Sodium bisulfate | 180.0 g |
| Boric acid | 25.0 g |
| Acetic acid | 10.0 g |

-continued

| Aluminum sulfate | 8.0 g |
| --- | --- |
| Water to 1 liter at pH 3.9 to 4.5 | |

EXAMPLES

The invention can be appreciated by reference to the following specific examples:

SCREENS

The following intensifying screens were employed:

Screen V

This screen has a composition and structure corresponding to that of a commercial, medium to high resolution screen. It consists of a terbium activated gadolinium oxysulfide phosphor having a median particle size of 5 to 6 $\mu$m coated on a blue dyed polyester support in a Permuthane polyurethane binder at a total phosphor coverage of 3.1 g/dm$^2$ at a phosphor to binder ratio of 19:1.

Screen W

This screen has a composition and structure corresponding to that of a commercial, high speed screen. It consists of a terbium activated gadolinium oxysulfide phosphor having a median particle size of 8 to 9 $\mu$m coated on a white pigmented polyester support in a Permuthane polyurethane binder at a total phosphor coverage of 13.3 g/dm$^2$ at a phosphor to binder ratio of 19:1.

The modulation transfer factors of the screens are shown and compared to Curve A in Table I:

TABLE I

Modulation Transfer Factors of Screens
% Modulation Transfer Factor at Various Cycles per mm

| Scrn. | 0 | 1.0 | 2.0 | 3.0 | 4.0 | 5.0 |
| --- | --- | --- | --- | --- | --- | --- |
| V | 100 | 87.7 | 68.5 | 52.8 | 40.3 | 30.6 |
| W | 100 | 47.1 | 20.8 | 11.0 | 6.8 | 4.5 |
| A | 100 | 63.6 | 33.0 | 18.9 | 11.4 | 7.8 |
| Scrn | 6.0 | 7.0 | 8.0 | 9.0 | 10.0 | |
| V | 23.5 | 18.4 | 14.8 | 12.0 | 9.8 | |
| W | 3.1 | 2.4 | 1.9 | 1.5 | 1.3 | |
| A | 5.6 | 4.2 | 3.2 | 2.5 | 2.0 | |

RADIOGRAPHIC ELEMENTS ELEMENT A
Example

Radiographic element A was a dual coated radiographic element exhibiting near zero crossover.

Radiographic element A was constructed of a low crossover support composite (LXO) consisting of a blue tinted transparent polyester film support on each side with a crossover reducing layer consisting of gelatin (0.52 g/m$^2$) containing 200 mg/m$^2$ of a processing solution bleachable arylidene dye (dye 59 of Dickerson et al U.S. Pat. No. 4,994,355).

Low contrast (LC) and high contrast (HC) emulsion layers were coated on opposite sides of the support over the crossover reducing layers. Both emulsions were green-sensitized high tabularity silver bromide emulsions. The low contrast emulsion was a blend of three emulsions whereas the first emulsion exhibited an ECD of 3.0 $\mu$m and an average grain thickness of 0.13 $\mu$m, the second emulsion exhibited an ECD of 2.0 $\mu$m and an average grain thickness of 0.13 $\mu$m, while the third emulsion exhibited an ECD of 0.8 $\mu$m and an average thickness of 0.13 $\mu$m. The high contrast emulsion exhibited less polydispersity than the low contrast emulsion. Both the high and low contrast emulsions were spectrally sensitized with 400 mg/Ag mol of anhydro-5,5-dichloro-9-ethyl-3-3-bis(3-sulfopropyl)-oxacarbocyanine hydroxide, followed by 300 mg/Ag mol of potassium iodide. The emulsion layers were each coated with a silver coverage of 2.42 g/m$^2$ and a gelatin coverage of 3.22 g/m$^2$. Protective gelatin layers (0.69 g/m$^2$) were coated over the emulsion layers. Each of the gelatin containing layers were hardened with bis(vinylsulfonylmethyl) ether at 1.5% of the total gelatin.

When coated as described above, but symmetrically, with Emulsion LC coated on both sides of the support and Emulsion HC omitted, using a pair of screens having the MTF characteristics of Curve A, Emulsion LC exhibited a relative log speed of 98 and an average contrast of 1.8. Similarly, Emulsion HC when coated symmetrically with Emulsion LC omitted exhibited a relative log speed of 85 with an average contrast of 3.0. The emulsion layer units thus differed in average contrast by 1.2 while differing in speed by 13 relative log speed units (or 0.13 log E).

When Element A was tested for crossover as described by Abbott et al in U.S. Pat. No. 4,425,425, it exhibited an apparent crossover of 2%. However, as explained by Abbott et al, there was no actual crossover, since this amount of apparent crossover is produced by direct X-ray absorption in the absence of crossover. Element A was labeled "(EmHC)LX-OA(EmC)".

Element B Control

Radiographic element B was a conventional double coated radiographic element exhibiting extended exposure latitude.

Radiographic element B was constructed of a blue tinted transparent polyester film support lacking the crossover reducing layers of radiographic Element A. Identical emulsion layers (L) were coated on opposite sides of the support. The emulsion employed was a green sensitized polydispersed silver bromoiodide emulsion. The same spectral sensitizing dye was employed as in Element A, but only 42 mg/Ag mole was required, since the emulsion was not a high aspect ratio tabular grain emulsion, and therefore, required much less dye for substantially optimum sensitization. Each emulsion layer was coated to provide a silver coverage of 2.62 g/m$^2$ and a gelatin coverage of 2.85 g/m$^2$. Protective gelatin layers (0.70 g/m$^2$) were coated over the emulsion layers. Each of the layers were hardened with bis(vinylsulfonylmethyl) ether at 0.5% of the total gelatin.

When Element B was tested for crossover as described by Abbott et al in U.S. Pat. No. 4,425,425, it exhibited a crossover of 25%. Element B was labeled "(Em. L)HXOB(Em. L)".

GRIDS Grid C1 Control

Grid C1 was a standard linear array grid consisting of 103 lines per inch (hereinafter indicated as lpi) with a 8:1 grid ratio, where grid ratio is the ratio of the thickness of the grid (h) divided by the width (d) of the grid slat spacing. Generally, a higher grid ratio indicates a grid capable of producing sharper images.

Grid E2 Invention

Grid E2 was constructed of 8 sheets each of which consisted of a 2 mil layer of lead foil laminated to a 4 mil layer of poly(ethylene terephthalate) film support. The lead foil was etched to form a halftone pattern of circular apertures (the pattern of FIG. 3). The apertures were 7 mils in diameter and were spaced 8.33 mils apart (center-to-center) spacing. The sheets contained 100 apertures per inch (hereinafter referred to as api). There were 10,000 apertures per square inch in each sheet. The grid was assembled by aligning the apertures of each sheet with those of the sheets stacked above and below. The sheets were then bonded together in alignment using a thermally activated adhesive. The resulting 8 sheet stack had a total thickness of 52 mils and a calculated grid ratio of approximately 6:1. The lead content of the grid was approximately 170 mg/cm$^2$.

ASSEMBLIES

The following assemblies were created using combinations of Elements A and B, Screens V and W, and Grids 1C and 2E:

TABLE II

| | Grid/Screen/Film/Screen Assembly | |
|---|---|---|
| 1. | [(C1) 100 lpi linear]V (EmL)HXOB(EmL)W | (Control) |
| 2. | [(E2) 100 api halftone]V (EmL)HXOB(EmL)W | (Control) |
| 3. | [(C1) 100 lpi linear]V (EmHC)LXOA(EmLC)W | (Control) |
| 4. | [(E2) 100 api halftone]V (EmHC)LXOA(EmLC)W | (Example) |

RADIOGRAPHIC EXPOSURES

The above assemblies were in each instance exposed as follows:

The assemblies were exposed to 100 KVp X-radiation, varying either current (mA) or time, using a 3-phase Picker Medical (Model VTX-650) X-ray unit containing filtration up to 3 mm of aluminum. Four inches of Lucite were used as the source of scatter and a 41 inch focus to film distance.

PROCESSING

The films were processed at 35° C. in a commercially available Kodak Rp X-Omat TM (Model 6B) rapid access processor in 90 seconds as follows:

| | |
|---|---|
| development | 24 seconds at 35° C., |
| fixing | 20 seconds at 35° C., |
| washing | 10 seconds at 35° C., and |
| drying | 20 seconds at 65° C., | where the remaining time was taken up in transport between processing steps. The development step employed the following developer:

| | |
|---|---|
| Hydroquinone | 30 g |
| 1-Phenyl-3-pyrazolidone | 1.5 g |
| KOH | 21 g |
| NaHCO$_3$ | 7.5 g |
| K$_2$SO$_3$ | 44.2 g |
| Na$_2$S$_2$O$_5$ | 12.6 g |
| NaBr | 35 g |
| 5-Methylbenzotriazole | 0.06 g |
| Glutaraldehyde | 4.9 g |

Water to 1 liter at pH 10.0, and the fixing step employed the following fixing composition:

| | |
|---|---|
| Ammonium thiosulfate 60% | 260.0 g |
| Sodium bisulfate | 180.0 g |
| Boric acid | 25.0 g |
| Acetic acid | 10.0 g |
| Aluminum sulfate | 8.0 g |
| Water to 1 liter at pH 3.9 to 4.5 | |

RESULTS

The assemblies were exposed to produce a maximum density of 1.2 in the radiographic elements after processing. The processed elements were examined for visibility of grid image patterns (artifacts) as shown in Table III below.

TABLE III

| Assembly | Subjective Rating* | |
|---|---|---|
| 1. | (Control) | 3 (slightly noticeable) |
| 2. | (Control) | 1 (minimally noticeable) |
| 3. | (Control) | 10 (very noticeable) |
| 4. | (Example) | 2 (minimally noticeable) |

*Ranging from 1 to 10 with the 1 being the least noticeable and 10 being the most noticeable From Tables II and III it is apparent for the high crossover screen and film combination V(EmL)HXOB(EmL)W the superimposed grid images produced with either grid C1 or E2 were only minimally or slightly noticeable and therefore posed little or no problem to the radiologist attempting to interpret radiographic images. This result obtains because the radiographic element (EmL)HXOB(EmL) does not produce images of sufficient sharpness to resolve the superimposed grid image. Consequently, it images either of the two grids used for scatter cleanup in an unsharp fashion with only minimal artifacts from the grids appearing. However, the high resolution, low crossover screen film assembly, V(EmHC)LXOA(EmLC)W, was found to produce images of such sharpness that it produces a very noticeable image of the superimposed linear grid C1. The grid lines were observed to interfere with radiographic anatomical information, a quite undesirable characteristic. It was expected that objectionable grid patterns would be produced by the assembly using any variety of grids with similar grid ratios. Surprisingly however, it was found that with the use of the grid (E2) the superimposed grid image was only minimally noticeable.

The invention has been described in detail with particular reference to preferred embodiments thereof, but it will be understood that variations and modifications can be effected within the spirit and scope of the invention.

What is claimed is:

1. An X-ray imaging assembly comprised of
    (I) a front and back pair of intensifying screens each capable of absorbing X-radiation and emitting electromagnetic radiation longer than 300 nm, the front screen being chosen to exhibit modulation transfer factors greater than those of reference curve A in FIG. 2, (II) a radiographic element mounted between the front and back intensifying screens comprised of a transparent film support, a front spectrally sensitized high tabularity silver halide emulsion layer unit coated on the support and located adjacent the front intensifying screen, a back spectrally sensitized high tabularity silver halide emulsion layer unit coated on the support and located adjacent the back intensifying screen, and means for reducing to less than 10 percent crossover to the front and back emulsion layers from the back and front screens, respectively, of radiation longer than 300 nm in wavelength, and (III) an X-ray collimating grid located adjacent the front screen to receive X-radiation prior to the front screen comprised of an X-ray opaque material forming an array of at least 85 X-ray transmission apertures per inch providing at least 50 percent open area, the apertures having nonlinear boundaries and a ratio of maximum to minimum cross-sectional widths ranging from 1:1 to 3:2.

2. The imaging assembly of claim 1 wherein the back emulsion layer unit exhibits a lower average contrast than the front emulsion layer unit.

3. The imaging assembly of claim 2 wherein
the front emulsion layer unit exhibits an average contrast of at least 2.5, but based on density measurements at 0.25 and 2.0 above minimum density,
the back emulsion layer unit exhibits an average contrast of less than 2.0, based on density measurements at 0.25 and 2.0 above minimum density,
the contrast of the front emulsion layer unit is determined with the front emulsion layer unit replacing the back emulsion layer unit to provide an arrangement with the front emulsion layer unit present on both sides of the transparent support, and
the contrast of the back emulsion layer unit being determined with the back emulsion layer unit replacing the front emulsion layer unit to provide an arrangement with the front emulsion layer unit present on both sides of the transparent support.

4. The imaging assembly of claim 1 wherein the back screen and the back emulsion layer unit in combination exhibit a photicity in the range of from 2 to 10 times that of the front screen and front emulsion layer unit in combination.

5. The imaging assembly of claim 4 wherein the back screen and back emulsion layer unit in combination exhibit a photicity in the range of from 2 to 4 times that of the front screen and the front emulsion layer unit in combination.

6. The imaging assembly of claim 1 wherein the crossover reducing means is capable of reducing crossover to less than 5 percent.

7. The imaging assembly of claim 6 wherein the crossover reducing means is capable of reducing crossover to less than 3 percent.

8. The imaging assembly of claim 1 wherein the front and back intensifying screens each include a fluorescent layer comprised of a phosphor chosen from rare earth oxychalcogenide and halide phosphors of the formula:

$$M_{(w-n)}M'_nO_wX$$

wherein
M is at least one of the metals yttrium, lanthanum, gadolinium, or lutetium,
M' is at least one of the rare earth metals dysprosium, erbium, europium, holmium, neodymium, praseodymium, samarium, terbium, thulium or ytterbium,
X is a middle chalcogen (S, Se or Te) or halogen,
n is 0.0002 to 0.2, and
w is 1 when X is halogen or 2 when X is chalcogen.

9. The imaging assembly of claim 1 wherein the front and back pair of intensifying screens each include a fluorescent layer comprised of a phosphor chosen from the group consisting of calcium tungstate, niobium-activated or thulium-activated yttrium tantalate, terbium-activated gadolinium or lutetium oxysulfide.

10. The imaging assembly of claim 8 wherein the front intensifying screen is thin relative to the back intensifying screen 11. The imaging assembly of claim 1 wherein the grid (III) is a flexible, lightweight structure comprised of a plurality of X-ray opaque sheets containing the apertures and arranged in a stack with the apertures in alignment from sheet to sheet.

12. The imaging assembly of claim 11 wherein the sheets contain at least 85 apertures per inch providing from 50 to 70 percent open area.

13. The imaging assembly of claim 12 wherein the sheets contain from 85 to 200 apertures per inch.

14. The imaging assembly of claim 13 wherein the sheets contain from 115 to 130 apertures per inch.

15. The imaging assembly of claim 13 the sheets contain from 180 to 200 apertures per inch.

16. The imaging assembly of claim 11 wherein the grid is comprised of from 4 to 14 stacked sheets.

17. The imaging assembly of claim 11 wherein within each sheet each aperture laterally surrounded by apertures is equidistant from the four laterally closest apertures.

18. The imaging assembly of claim 11 wherein within each sheet each aperture laterally surrounded by apertures is equidistant from the six laterally closest apertures.

19. The combination of the imaging assembly of claim 1 and an X-ray cassette containing the imaging assembly.

* * * * *